United States Patent [19]

Galer et al.

[11] 4,221,286

[45] Sep. 9, 1980

[54] PAIL BAIL HOLDER

[75] Inventors: Herbert W. Galer; Charles M. Menefee, both of Newnan, Ga.

[73] Assignee: United States Steel Corporation, Pittsburgh, Pa.

[21] Appl. No.: 896,270

[22] Filed: Apr. 14, 1978

[51] Int. Cl.[2] .............................................. B65G 29/00

[52] U.S. Cl. ................................ 198/377; 101/38 A; 118/500; 279/3

[58] Field of Search ........................ 198/377, 378, 344; 414/772, 776, 773, 783; 214/10 C, 1 BD, 1 BH, 1 BV; 101/5, 7, 22, 23, 38 R, 38 A; 118/500, 503, 230, 319; 279/3

[56] References Cited

U.S. PATENT DOCUMENTS 2,071,345 2/1937 Johnson .............................. 118/230

2,245,425 6/1941 Aungst ............................ 118/503 X

FOREIGN PATENT DOCUMENTS 376239 8/1907 France .................................... 118/500

OTHER PUBLICATIONS

Kase Equipment Pub. on Model KSP-612-W.

*Primary Examiner*—Robert B. Reeves
*Assistant Examiner*—Douglas D. Watts
*Attorney, Agent, or Firm*—William L. Krayer

[57] ABSTRACT

Apparatus for restricting the movement of a pail bail facilities pail finishing processes, such as labeling. A blocking element for engagement with the pail bail intersects the locus of movement of the bail, so that its movement relative to the pail is restricted during pail manipulation.

3 Claims, 2 Drawing Figures

PAIL BAIL HOLDER

BACKGROUND OF THE INVENTION

This invention relates to the manufacture of open-head pails and the like which have pivotal bails. More particularly, this invention makes possible the manipulation of a pail during a finishing process, such as labeling, without having to first remove its bail.

Typically, the ends of a pail bail are centrally pivoted at the side of the pail. The hand grip portion generally lies equidistant from the pivots. When mounted in this fashion, the bail may swing freely from one side of the pail to the other; the locus of movement of the hand grip describing an arc of a circle. This freedom of movement of the bail offers a great convenience in using the pail, but is the source of a significant problem in finishing processes related to pail manufacture. One such finishing process, off-set printing of labels on pail sides, requires the pails to be rotated and revolved. This movement sets up centrifugal forces which swings the bail radially outward to a position along the side of the pail, i.e. the position where the label is desired. This can result in the label being misprinted or not printed at all. Therefore, the successful labeling of pails has required that the bail not be attached to the pail until after the printing procedure. This requirement results in the inefficient utilization of manpower in the pail manufacturing process.

In a plastic pail manufacturing operation, for example, it would be most advantageous to have the bails installed on the pails by the molder, immediately after molding. This is because the rate of molding, generally, is one-tenth the rate of labeling. To install the bail after printing requires an extra person on the printing line, while to install it after molding can be accomplished by the molder.

As a result thereof, considerable time and expense could be saved by restricting the free movement of the pivotal pail bail so as to allow the bail to be installed on the pail before finish processing, such as labeling. This is achieved in the instant invention by provision, in the labeling apparatus, of a bail blocking element which prevents the bail from pivoting when the pail is rotated or revolved during a printing operation.

DETAILED DESCRIPTION OF THE INVENTION

Figure 1:
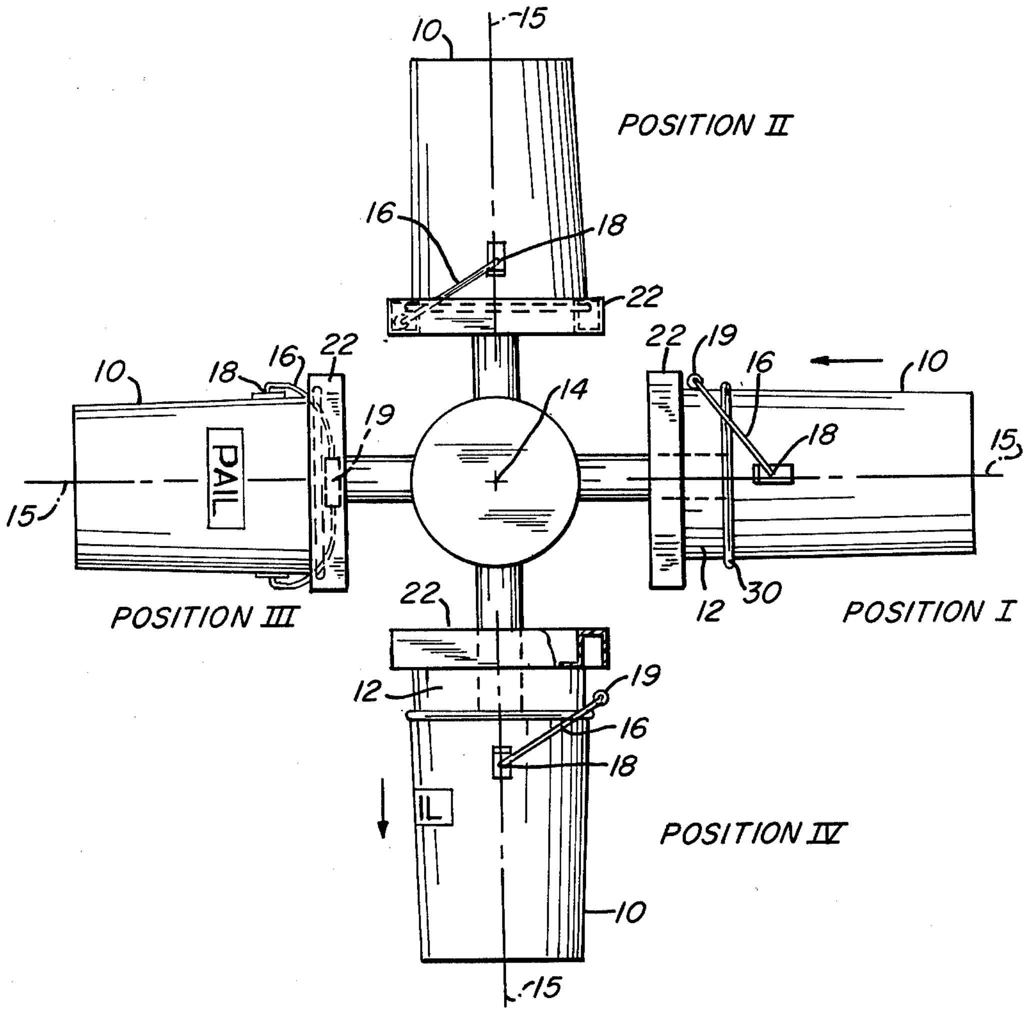
FIG. 1 schematically illustrates pails in place on the mandrels of an off-set printer having the present invention incorporated therein.

Referring to FIG. 1, the invention is illustrated specifically in connection with an off-set printing machine for the continual labeling of pails. The four principal process steps involved in the printing of a pail side are indicated. Position I, the load situation, illustrates the step of placing a pail 10 on a mandrel 12. The mandrel 12 is equipped with means for retaining the pail in a fixed position thereon. Thereafter, the mandrel and pail are revolved about axis 14 of the printer to Position II, the flame-treat station, at which position the pail side is heated, by rotation of the pail around its longitudinal axis 15 past a stationary heating element (not shown) so as to prepare the pail for receiving the label. The thus heated pail is thereafter revolved about axis 14 to Position III, the printing station, where the pail is labeled by rotation around its longitudinal axis 15 against the off-set printing roll (not shown). Finally, having been labeled, the pail is revolved to Position IV, the eject station, where it is ejected from the mandrel onto a conveyor. The now empty mandrel then moves to Position I again, to receive another pail.

Figure 2:
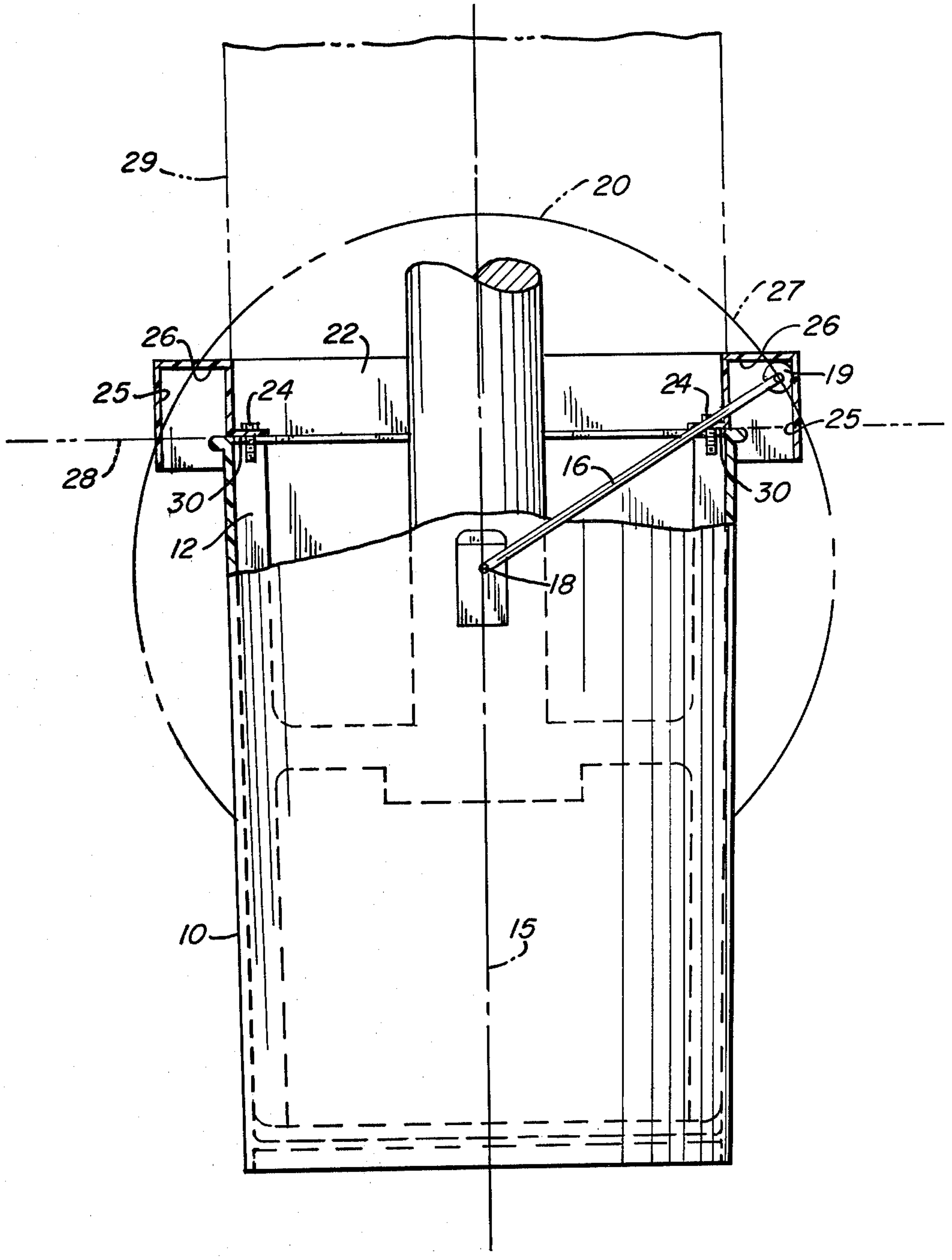
FIG. 2 is an expanded view of one of the pails of FIG. 1 partially broken away better to illustrate the blocking means of the present invention.

Referring now to FIG. 2, pail 10 is shown with bail 16 attached thereto at pivot points 18 lying along a transverse axis of the pail. The pail 16 is provided with a hand grip portion 19. The arc of travel 20 of hand grip 19 is an arc of a circle having a radius equal to the distance from pivot points 18 to grip 19. To prevent the bail 16 from moving toward or away from longitudinal axis 15 when the pail is rotated or revolved, blocking element 22 is attached to mandrel 12 by bolts or screws 24 so that cooperating blocking surfaces 25 and 26 intersect the arc of travel 20 of bail 16. Blocking surface 25 restricts bail 16 from moving away from axis 15 to a position between the pail body and the off-set printing roll. Blocking surface 26 prevents bail 16 from moving toward axis 15 to a position where grip 19 might become lodged behind mandrel 12 and thus prevent the automatic ejection of the pail from the mandrel at Position IV (FIG. 1). In a situation where the mandrel is provided with a sloped surface from its shaft to its outer surface, the provision of blocking surface 26 on blocking element 22 would be unnecessary. Blocking surfaces 25 and 26 intersect the arc of travel 20 on a segment 27 of arc 20 defined by the intersection of arc 20 with (a) the plane 28 in which the open end of pail 10 lies and (b) the cylindrical plane 29 orthogonal to plane 28 on which the top edge 30 of pail 10 lies.

Blocking element 22 may be disposed continuously as shown in FIG. 2 or it may be disposed in a continual fashion. In a continual fashion, the blocking element could comprise, for example, interrupted blocking segments joined by wires and supported by spokes from the mandrel shaft. In both cases, though, blocking element 22 is disposed circumferentially around the pail intersecting the annular surface described by the rotation of the arc segment 27 about longitudinal axis 15 of the pail.

In the operation of the printer on which the present invention is installed (FIG. 1), a pail 10 with its bail 16 forward of the top plane 28 is placed on a mandrel 12 in Position I. With bail 16 forward, hand grip 19 is sure to engage the blocking surface or surfaces of blocking element 22. The movement of the pail onto the mandrel forces bail 16 into position against blocking element 22 (FIG. 2). With pail 10 held firmly in place on the mandrel, the movement of bail 16 is confined to the segment of arc 20 between the blocking surfaces of blocking element 22. Throughout the operation of the printer, as the pail is rotated and revolved, bail 16 remains in its initial position, caught by the blocking element 26. When the mandrel reaches Position IV and the pail is ejected, the handle is free to move away from the blocking element.

We claim:

1. In an apparatus having (i) means for rotating an open-ended pail about its longitudinal axis and menas for revolving it about an axis orthogonal to said longitudinal axis, (ii) a mandrel for receiving said pail and (iii) means for retaining the pail on said mandrel during rotation; said pail having a bail pivoted at the sides thereof, said pivots lying along a transverse axis of the pail, said bail having a hand grip portion located equidistant from said pivots, the locus of movement of said hand grip describing an arc of a circle, the improvement for preventing such movement when the pail is rotated, which comprises: a supported bail blocking element having two blocking surfaces which intersect said arc at points lying on a segment thereof, said segment being defined by the intersection of said arc with (a) the plane of the open end of said pail and (b) the cylindrical plane orthogonal to said open end, said blocking element being circumferentially disposed along an annular surface described by the rotation of said arc segment about said longitudinal axis.

2. The improvement of claim 1 wherein said blocking element is continuous.

3. The improvement of claim 1 wherein said blocking element has a pair of cooperating blocking surfaces.

* * * * *